US006748380B2

(12) United States Patent
Poole et al.

(10) Patent No.: US 6,748,380 B2
(45) Date of Patent: Jun. 8, 2004

(54) METHOD, SYSTEM, AND PROGRAM PRODUCT FOR PERMISSION TO ACCESS SOFTWARE

(75) Inventors: Rebecca Lau Poole, San Jose, CA (US); Laurence Edward England, Morgan Hill, CA (US); Howard Justin Glaser, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 09/855,377

(22) Filed: May 14, 2001

(65) Prior Publication Data

US 2002/0169781 A1 Nov. 14, 2002

(51) Int. Cl.$^7$ ................................................. G06F 7/00
(52) U.S. Cl. ............................. 707/9; 707/3; 707/102; 717/168; 717/174
(58) Field of Search ..................... 707/1–206, 103 R; 717/100, 168, 174; 709/203–220; 713/161–202; 715/511, 530

(56) References Cited

U.S. PATENT DOCUMENTS

| | | | |
|---|---|---|---|
| 5,170,466 A | 12/1992 | Rogan et al. ................ 395/145 |
| 5,301,350 A | 4/1994 | Rogan et al. ................ 395/800 |
| 5,321,816 A | 6/1994 | Rogan et al. ................ 395/200 |
| 5,345,550 A | 9/1994 | Bloomfield .................. 395/156 |
| 5,384,911 A | 1/1995 | Bloomfield .................. 395/157 |
| 5,412,776 A | 5/1995 | Bloomfield et al. ......... 395/160 |
| 5,483,655 A | 1/1996 | Auricchio et al. ........... 395/700 |
| 6,023,706 A * | 2/2000 | Schmuck et al. ............ 707/200 |
| 6,032,216 A * | 2/2000 | Schmuck et al. ............ 710/200 |
| 6,047,312 A | 4/2000 | Brooks et al. ............... 709/203 |
| 6,405,202 B1 * | 6/2002 | Britton et al. ................... 707/9 |
| 6,457,130 B2 * | 9/2002 | Hitz et al. .................... 713/201 |
| 6,519,571 B1 * | 2/2003 | Guheen et al. ................ 705/14 |
| 6,532,476 B1 * | 3/2003 | King ......................... 707/104.1 |
| 2001/0025311 A1 * | 9/2001 | Arai et al. ................... 709/225 |
| 2002/0108101 A1 * | 8/2002 | Charisius et al. ........... 717/105 |
| 2002/0147706 A1 * | 10/2002 | Burnett ........................... 707/3 |
| 2003/0041093 A1 * | 2/2003 | Yamane et al. .............. 709/201 |
| 2003/0041094 A1 * | 2/2003 | Lara et al. ................... 709/201 |

OTHER PUBLICATIONS

Barstow, Arthur F., *The CDE action and data typing services*, Hewlett–Packard Journal, Apr. 1996 v47 n2 p24(5).
Joy, Molly, *Migrating HP VUE desktop customizations to CDE*, Hewlett–Packard Journal, Apr. 1996 v47 n2 p29(9).
Simon, Barry, *The Windows 95 registry, part 2*, PC Magazine, Nov. 7, 1995 v14 n19 p329(4).

* cited by examiner

*Primary Examiner*—John Breene
*Assistant Examiner*—Kuen S. Lu
(74) *Attorney, Agent, or Firm*—Karna J. Nisewaner

(57) ABSTRACT

Accessing a legacy target file with a potentially corrupting development tool, where the target file is characterized by its attributes, and the development tool is characterized by its tool capabilities, including the capability to return the target file with changed attributes. Protecting target file attributes is accomplished by limiting development tool access to the target file if development tool capabilities mismatch target file attributes. This is achieved by determining target file attributes from a source of target file attribute information. The determination of access is done by matching target file attributes to tool capabilities and granting development tool access to the target file if there is a match of target file attributes and tool capabilities, and denying or limiting access if there is a mismatch. A further step is assigning a registration permission key tool to the development tool if the development tool capabilities match the target file attributes.

41 Claims, 6 Drawing Sheets

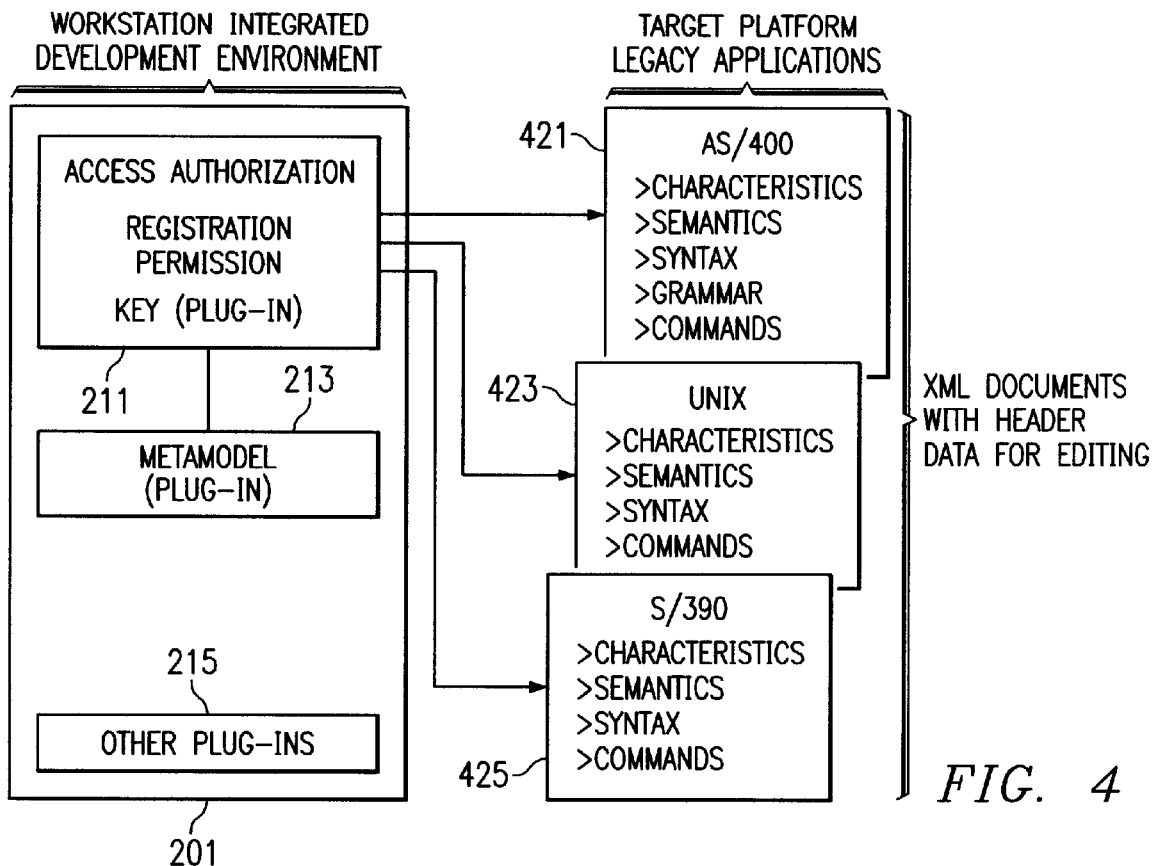
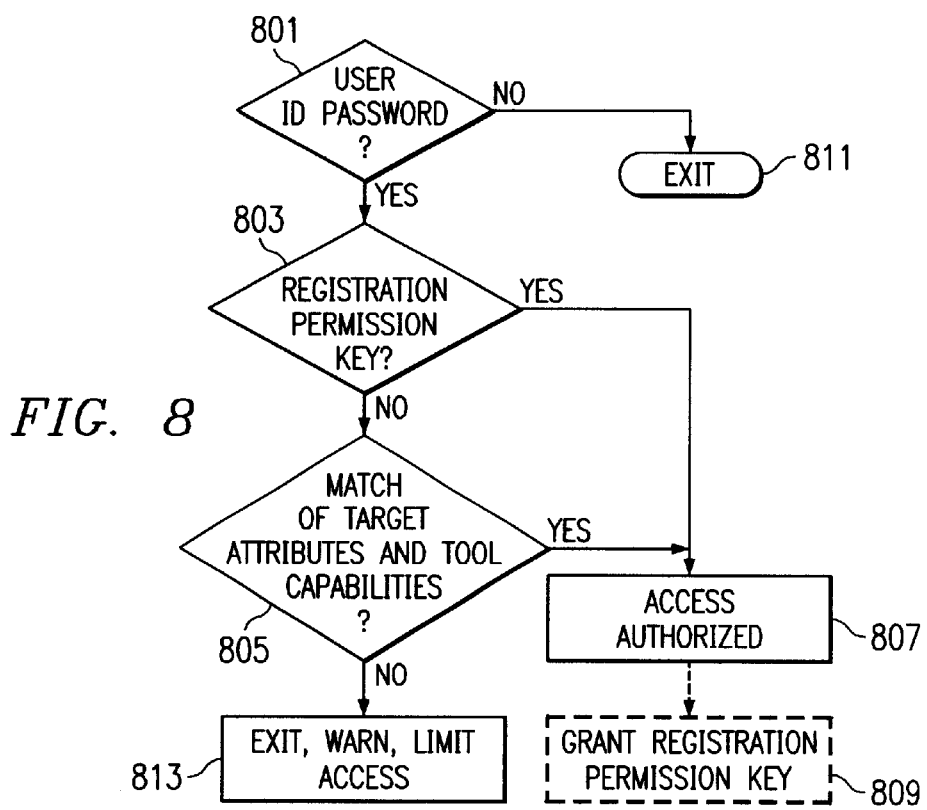

METHOD, SYSTEM, AND PROGRAM PRODUCT FOR PERMISSION TO ACCESS SOFTWARE

FIELD OF THE INVENTION

This invention relates to increasing a computer system's protection of system software, other software, and data from unauthorized, improper, or incorrect modification by an end developer or other software or agents, for example by checking or monitoring of information, such as authorization code data.

BACKGROUND OF THE INVENTION

Interconnectivity frequently requires new code in legacy applications, typically COBOL on mainframe computers, or new interface or client applications interfacing with existing legacy applications, frequently customized interfaces on proprietary versions of SQL servers. The very process of applying the new code to a base or legacy application may corrupt either the program code or the stored data, and the legacy or base application, because of a mismatched tool or add-on.

For example, in opening, editing, and saving, by way of illustration only and not limitation, COBOL files, a new tool designed for a newer COBOL version, may open up the target COBOL file written and compiled using an earlier version of COBOL, read the target COBOL file into the development tool, and inadvertently convert the target COBOL file from the old version to the new version upon saving. This mismatch totally corrupts the now saved COBOL file. Another example arises when the development tool encounters IBM EBCDIC COBOL (extended binary-coded decimal interchange code), converts it to ASCII, applies the changes using a later version of COBOL, and reconverts the changed file back to EBCDIC with disastrous results. Unfortunately, industry standard conversion programs allow different operating systems to change a file from one code to another, as EBCDIC COBOL 85 to ASCII COBOL 85 to ASCII COBOL 97 to EBCDIC COBOL 97, to run on an EBCDIC COBOL 85 platform, and now with overwriting of one or more of the sequence area, the indicator area, area a (columns 8–11), area b (columns 12–72), or the label area, introducing unrecognized commands, improper data types, line wrap or other artifacts or errors.

Exemplary errors and artifacts that can be inadvertently introduced include ignoring or disregarding the column dependency and fixed zones of COBOL, omitting sections required by the target version of COBOL, entering improper data, or accepting incorrect, editor suggested, defaults in the required COBOL sections (Identification, Program ID, Environment Division). Still other errors include syntactical errors and formatting errors from one version of the target COBOL file to the incorrect version of COBOL supported by the development tool. Still other sources of file corruption include entering reserved words (commands) that differ from one COBOL version to another.

How this happens is shown in FIG. 1, which illustrates a legacy file 101 being edited by an integrated development environment ("IDE") including a development tool, 103. The legacy file 101, represented in the FIGURE as an S/390 DBMS SQL file 101 has one set of concatenation commands, character string extraction commands, data type conversions, aliases, and the like. These particular SQL functions are among the set of SQL functions that differ between versions of SQL. The file 101 is exported to a Unix workstation with an Integrated Development Environment (IDE) 103 that supports a different version of SQL. The S/390 DBMS SQL file 101 is modified, and returned from the work station with another, different set of concatenation commands, character string extraction commands, data type conversions, and aliases. These commands and functions are proper for a different version of a DBMS, but not for the DBMS version 101 residing on the S/390 platform.

Similar kinds of errors or file corruption are just as likely in writing applications to the various versions of SQL and DBMSs. Typically, an application program runs as a plug-in or application on top of a DBMS. As used herein "plug-in" applications, which may be tools, are programs that can easily be installed and used as part of a base program. A plug-in application is recognized automatically by the base program and its function is integrated into the target file that is being presented. The program or plug-in could be an order entry program, an inventory management program, a financial program, a CRM program, or the like. When there is a need to port the application program to a different version of SQL running on a different DBMS, the differences between frequently used commands in modern versions of SQL running on different DBMSs can wreak havoc throughout the enterprise. One version of SQL may use a plus sign for concatenation while the other version of SQL use two pipes for concatenation; there may be differences in one or more of creating column name aliases, extracting part of a character string, performing data type conversions, returning a number's ceiling, getting a current date or the next day's date. Still other problems include operations within a GROUP_BY, improper JOINs, table aliases with and without AS, the use of FROM and FROM following DELETE, the CREATE_TABLE syntax, the use of NULL and NOT_NULL, ALTER_TABLE rules and implications, DROP_TABLE rules and implications, the use or non-use of ORDER_BY in VIEWs, SAVEPOINT creation and use, and ranges (minimum values, maximum values, ranges, data types, user defined data types).

For example, in the case of savepoints, one DBMS's SQL establishes savepoints by:
SAVEPOINT delete1
. . .
ROLLBACK delete1
while another DBMS's SQL establishes savepoints by
SAVE TRANSACTION delete1
. . .
ROLLBACK TRANSACTION delete1

Vastly different code is used to achieve the same result, and this is not anomalous or atypical. It is a real world problem faced by real world programmers every day. For this reason, platform owners developing new applications, for example, e-business applications, based upon or interfacing with legacy systems, as well as systems running on disparate platforms, are challenged with the need to protect the base legacy system (or other host systems) from corruption, and to uniquely identify and associate various file types and artifacts from multiple disparate platforms with the appropriate integrated development environments (IDE), viewers, editors and transformation tools compatible with the characteristics and attributes of those objects. Use of the wrong integrated development environments, viewers, editors and transformation tools can lead to corruption of files and loss of data.

Thus, a clear need exists to enable a platform owner to protect their software assets from corruption.

SUMMARY OF THE INVENTION

According to the method, system, and program product of our invention, target applications, typically, legacy applications, and the data resident therein, is protected from corruption and even destruction by comparing and matching a repository of target file attributes (target file metadata) and development environment, viewer, editor, or transformation tool capabilities (development tool metadata).

This is accomplished through the method, system, and program product of our invention, which provide for accessing a target file with a potentially corrupting development tool. The target file is characterized by its attributes, and the development tool is characterized by its tool capabilities, including the capability to return the target file with possibly harmfully changed attributes. Protecting target file attributes from harmful change is accomplished by limiting development tool access to the target file if the development tool capabilities mismatch target file attributes. This is achieved by determining target file attributes from a source of target file attribute information. The source of target file information is chosen from, for example, target file header information, a repository of target file attributes, an associated DTD file, or an encapsulating XML file. The actual determination of access is done by matching target file attributes to tool capabilities and granting development tool access to the target file if there is a match of target file attributes and tool capabilities, and denying or limiting access if there is a mismatch. A further step is assigning a registration permission key tool to the development tool if the development tool capabilities match the target file attributes.

Target file access is granted or denied based on matches or mismatches of target and development tool metadata elements. Each platform owner may have a unique registration of their file types and artifacts based upon developer access/authorization as well as which tools (integrated development environments, viewers, editors, transformation, etc) may act upon the file types and artifacts. In this way, when a development tool requests access to a target application, the development tool's capabilities (development tool metadata) are compared to the target's attributes (target metadata), and access is authorized based upon a match of the tool metadata with target metadata. Additionally, the access/authorization can be recorded, for example, on the platform or the development tool, as a Registration Permission Key. The access/authorization depends upon a proper match of target file attributes and development tool capabilities. Access/authorization is communicated back to the development tool which initiated the request, typically, a workstation based IDE.

The method, system, and program product of the invention provide a way to let the platform owner uniquely: (1) register the category of developers who can access certain file types and resources and in what capacity (e.g. None, Read-Only, Read-Write, Execute-Only), (2) register any attributes, including characteristics and platform-specific information, of the file types and resources which must be adhered to (e.g. Fixed record length) or communicated back, (3) register any restrictions regarding what type of computer programs can operate on the file types and resources (e.g. introduce a category for tools so that future tools which belong to this category can be considered as potential candidate tools which may operate against this file type); likewise, this category also can indicate that this file type will not accept future tools unless designated by an administrator within the platform owner's company, and (4) register any associations to specific tools or command files (e.g. a specific JCL for compilation or a specific JCL for linking, etc.) as well as specific invocation options for those tools.

In a further embodiment of our invention an end user can create a new or derivative file that inherits file characteristics from file type data in the repository. In this aspect of the invention, repository metadata functions as a template or style sheet, and, in combination with one or more of an integrated development environment, a an editor, a complr, a syntax editor, or parser, created a system compatible file with inherited characteristics and attributes.

Additionally, as noted above, access/authorization for a particular development tool/target combination or for a particular developer/development tool/target combination, can be recorded, for example, on the platform or the development tool, as a Registration Permission Key. This registration task may be performed by an administrator or someone who has the proper authorization and familiarity with the target system/platform.

By providing a mechanism to allow the platform owner to uniquely register development tool access and developer access to each of their platform's file types and artifacts, it is possible to minimize the possible corruption of files and loss of data through accidental usage of the wrong viewers, editors, transformation tools or through non-authorized access. According to the invention tool and developer access is based upon individual developer access, tool and file attributes and characteristics, platform specifications, restrictions, options, etc.

Typically, the method is carried out on a development platform having a development tool, text editor, or integrated development environment, using a program product containing program code that directs, configures, and controls the development platform. A program product is a storage medium, as a hard drive, a CD-ROM, a tape, floppy discs, or the like, containing computer readable code to direct a computer to perform a task.

THE FIGURES

The method, system, and program product of the invention are illustrated in the FIGURES below.

FIG. 1 illustrates a legacy file, here an S/390 DBMS SQL file, being exported with one set of concatenation commands, character string extraction commands, data type conversions, aliases, and the like, to a Unix work station with an Integrated Development Environment (IDE). The S/390 DBMS SQL file is modified, and returned from the work station with another, different set of concatenation commands, character string extraction commands, data type conversions, and aliases, proper for a different version of a DBMS, but not the one residing on the illustrated platform.

FIG. 2 illustrates a workstation with an integrated development environment interacting with three legacy applications on three separate platforms. The Integrated Development Environment includes an access authorization registration key tool, at least one metamodel tool, and other plug-ins. The legacy applications are shown with enumerated characteristics (metadata).

FIG. 3 illustrates a workstation with an integrated development environment interacting with three legacy applications on three separate platforms. The Integrated Development Environment includes an access authorization registration key tool, at least one metamodel tool, and other plug-ins. The legacy applications are shown with enumerated characteristics (metadata) in a file header.

FIG. 4 illustrates a workstation with an integrated development environment interacting with three legacy applications on three separate platforms. The Integrated Development Environment includes an access authorization registration key tool, at least one metamodel tool, and other plug-ins. The legacy applications are shown with enumerated characteristics (metadata) and with associated files, which are illustrated as XML files containing the code portion and the code metadata.

FIG. 5 illustrates a workstation with an integrated development environment interacting with three legacy applications on three separate platforms. The Integrated Development Environment includes an access authorization registration key tool, at least one metamodel tool, and other plug-ins. The legacy applications are shown with enumerated characteristics (metadata) and with links to a metadata repository which is used for the access/authorization comparison.

Figure 7:
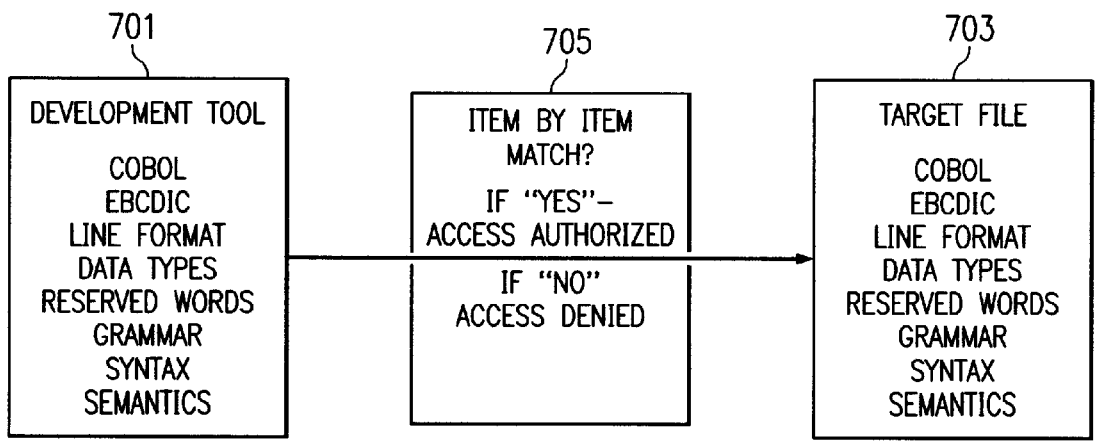
FIG. 7 illustrates the matching of the development tool metadata and the target file metadata to determine if access should be granted or denied.

FIG. 8 is a high level flow chart of the method of one embodiment of the invention, where the user's USERID and PASSWORD are tested for access, and if successful, the development tool is tested for a registration permission key. If successful, that is, if the tool has a registration permission key, access is authorized. If the development tool does not have a registration permission key, the tool is checked for a match of tool metadata and target metadata, as shown in FIG. 7. If successful, access is authorized. If unsuccessful, full access is denied, but partial access may be granted.

Figure 9:
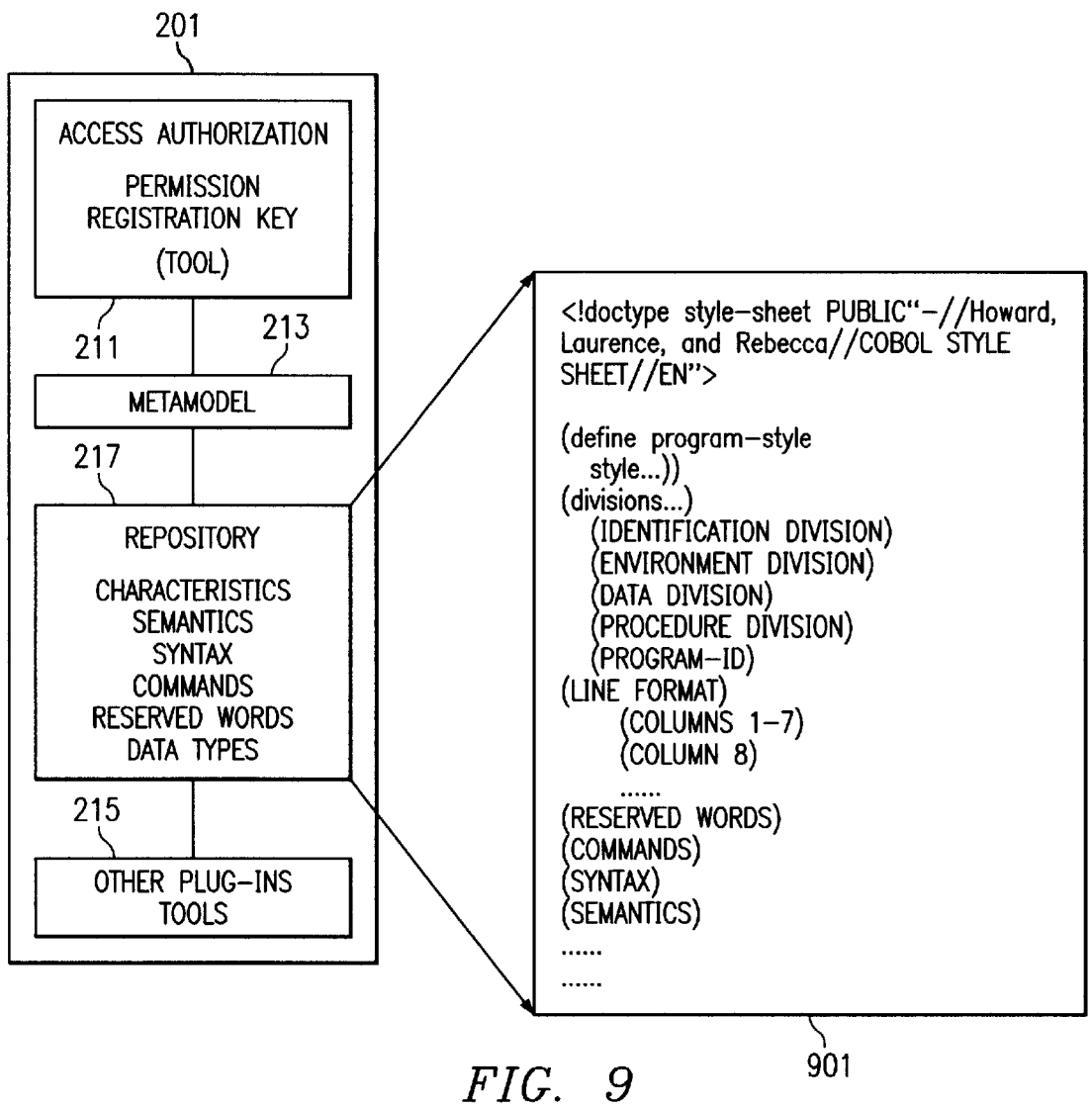

FIG. 9 illustrates a further embodiment of the invention where the repository contains a style sheet or similar artifact or aid for creating or editing a file of a file type stored in the repository.

DETAILED DESCRIPTION OF THE INVENTION

1. Overview of the Invention

The method, system, and program product of the invention provides development tool access control for accessing legacy systems based upon a comparison of legacy application attributes and tool capabilities. The invention includes a new development tool, exemplified by an IDE framework, which is based on providing an access controlled development environment with access controlled as shown generally in the access control engine of FIG. 7 and the access control method of FIG. 8, and using the target file metadata as shown in FIGS. 2 through 5. The attribute-capability based access authorization, along with the appropriate viewers, editors and transformation tools supports the developer's need for safe, non-corrupting access to legacy applications, especially the e-business developer's needs for such access.

As described above, "plug-in" applications, which may be tools, are programs that can easily be installed and used as part of a base program. A plug-in application is recognized automatically by the base program and its function is integrated into the target file that is being presented. As used herein, the base program is an element of a development tool, a development kit, or an integrated development environment, and the terms "development tool", "development kit", and "integrated development environment" are used interchangeably for the purpose of describing the method, system, and program product of the invention.

Allowing each platform owner to uniquely identify, tailor, and register appropriate access authorizations and levels and permitted actions as a function of target file characteristics, file types, and artifacts, and in compliance with the rules of the platform is accomplished through the availability of repository or a collection of target file metadata. That is, target file characteristics, file types, and artifacts are collected and presented to control acess to the underlying target application. This target file metadata is used to grant or deny access, e.g., dynamically in real time or through a registration permission key tool or by real time. Information such as the file and artifact's metadata, an actual faithful replica of the file and artifact's content, valid developer/tool access information, etc. is captured and stored, for example, in a metamodel or metadata repository, to grant or deny access. Access may be controlled, for example, by the registration permission key tool, a token, or a userid and password. This metamodel, with its metadata repository or access thereto, is realized as a tool in the IDE so that its information will be accessible to other tool(s) in the IDE. The other tools may be responsible for the presentation of the target file's characteristics, such as, grammar, syntax, types and artifacts.

2. Components of the Method, System and Program Product

One component of the method, system, and program product of the invention is a collection and presentation, as a form of metadata, of the target application file's characteristics, including grammar, syntax, format, file types, and artifacts, which is accessible for determining access to the application file.

A second component of the method, system, and program product of the invention is a registration permission tool, which allows platform owners or administrators to log attributes, characteristics, capabilities, and users. The registration permission tool may be registration permission key based, token based, or userid/password based, which is derived from tool metadata and target file metadata, and which allows each platform owner to uniquely identify and register appropriate accessibility and actions to the file types and artifacts, by user and by tool, in compliance with the rules of the platform where they originally reside.

A third component of the method, system, and program product of the invention is a platform owner interface for the permission tool. This interface allows the platform owner to specify and connect to a platform and then registers any or all of that platform's file types and artifacts. Each registration will contain information such as:

1. Categories of developers who may access this in read-only, read-write, execute or no access.
2. Supplemental attributes, characteristics and platform-specific information pertaining to the particular file type which must be adhered to or communicated back to a user.
3. Categories of tools which may access a particular target file in read-only, read-write, execute, or no access.
4. Any special invocation options to specific tools or command files.
5. Storage of the information gathered along with a faithful replica of the file and artifact's content into a metamodel which will be realized as a tool in the developer tool, IDE, or the like, so that its information will be accessible to other tool(s) in the developer tool or IDE.

3. Accessing The Target File

The invention provides a method of, a system for, and a program product for safely accessing a target file, such as a legacy application file, with a tool that has the capability of adversely changing the target file, and is from a class of tools that can corrupt, damage, or destroy the target file. Most commonly, the tool is an editing tool, a software development tool or kit, or an integrated development environment, or the like. Typically, the tool is personal computer or workstation based tool, and the target file is a legacy application, exemplified by mainframe applications, such as COBOL applications and database management systems, frequently coded in EBCDIC. According to the invention, access to the target file is authorized based upon a match of tool capabilities metadata and target file attributes metadata. As noted above, this match may be a dynamic match carried out in real time, or a previously completed match, evidenced by a key, token, or a database entry. That is, the tool capabilities metadata has to conform to the target file attributes metadata, and there can be no conflict in tool capabilities versus target attributes that would corrupt, damage, or destroy the target file. Prohibited capability-attribute mismatches can be in syntax, content, format, e.g., using MS SQL Server commands in Oracle SQL; or exceeding COBOL fixed zone lengths, or inserting artifacts during editing, or saving, as the RTF artifact "☐" inserted during a save.

4. Building The Metadata Repository

Figure 1:
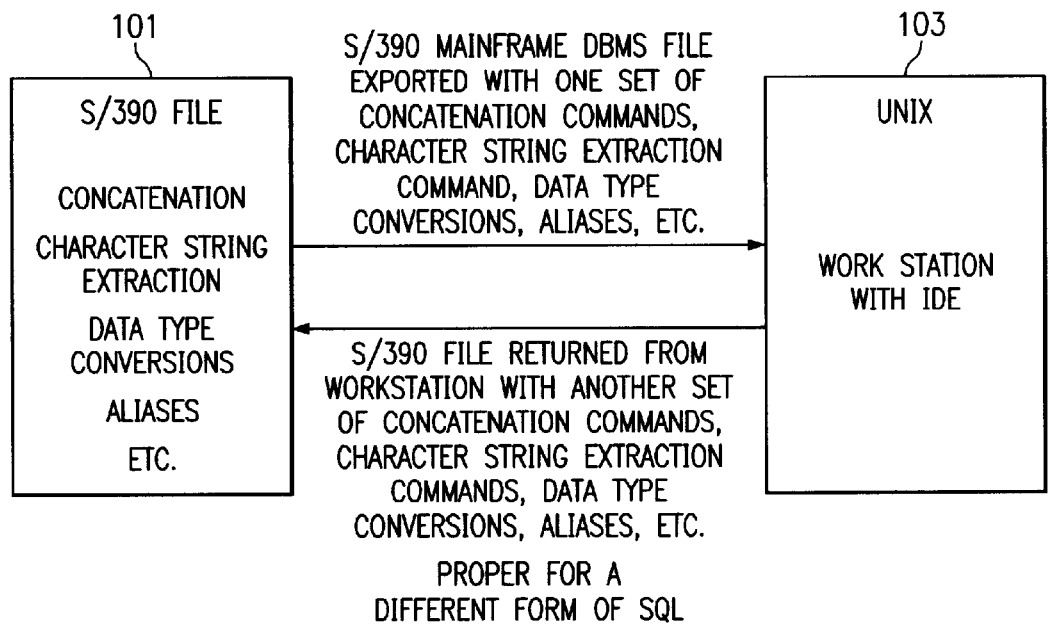
Figure 2:
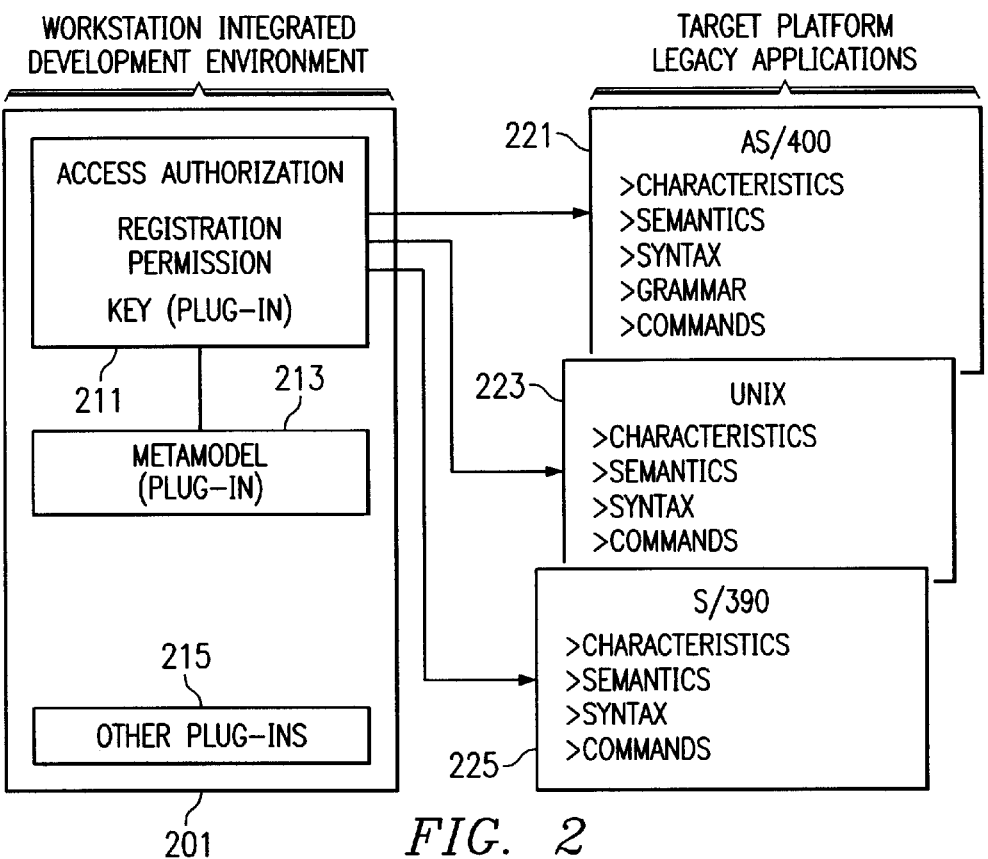

Before determining compatibility based upon tool capabilities metadata and target file attribute metadata, it is necessary to collect the target file attribute metadata and the tool capability metadata. An initial step is (1) collecting target file attributes, especially attributes susceptible to corruption, and (2) collecting or otherwise making available tool capabilities, especially tool capabilities that when mishandled could corrupt or destroy the target file. This information is stored to be accessible to the tool. For example, target attributes, also referred to as target file metadata, may be stored in a target file header, an associated file (e.g., a DTD file), a tagged "container" file (e.g., an XML file with target attributes in the header), or in a separate data repository or registry file. A system with a workstation 201 having an access authorization 211 with a registration permission key plug in, a metamodel tool 213, and other plug-ins 215 is shown interfacing with a target platform in FIG. 2. The target platform is characterized by illustrative legacy applications, here an AS/400 application 221, a Unix application 223, and a S/390 application 225. FIG. 2 shows exemplary characteristics (metadata) for each of the legacy applications.

The target file attributes or metadata may be initially collected by an administrator, vendor, or the like, or may be automatically collected by parsing the target file.

Figure 3:
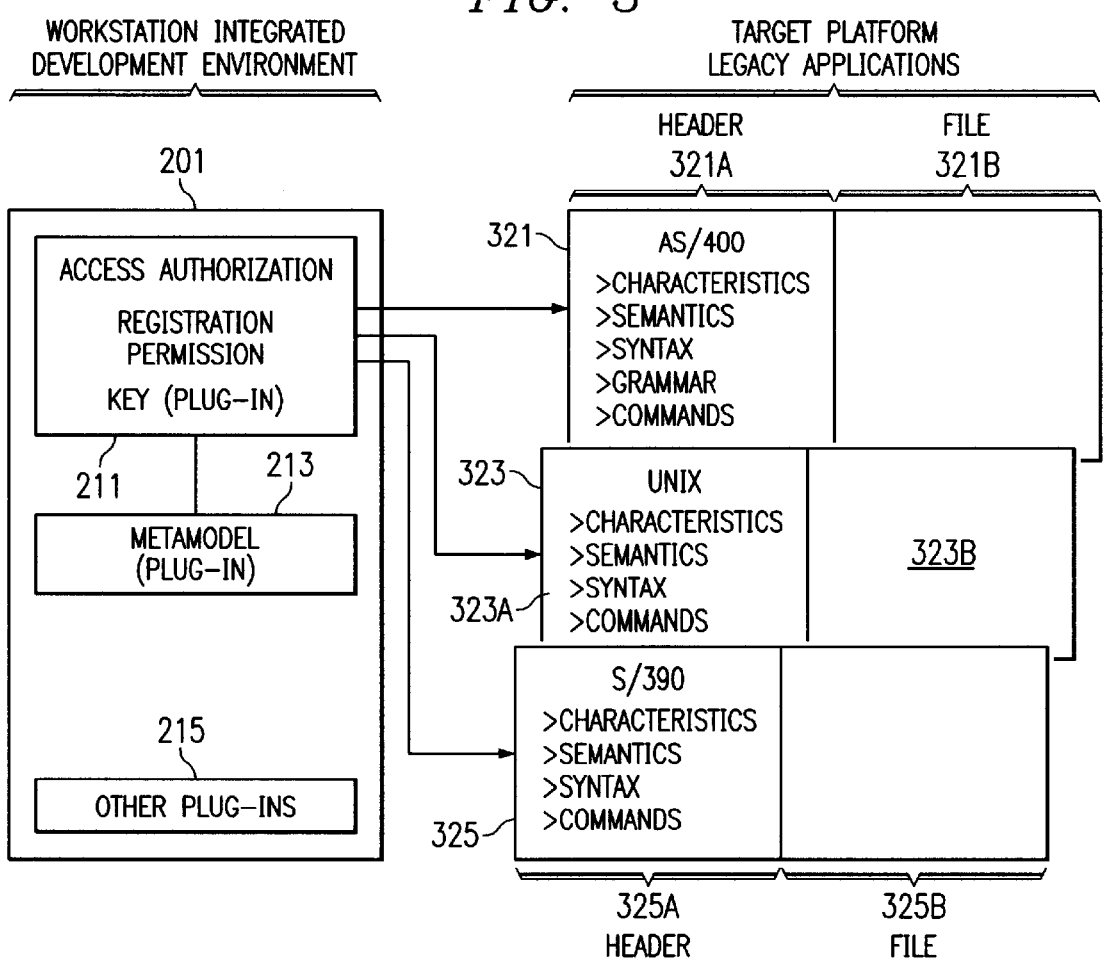

Alternatively, the enumeration of target file attributes may be data contained in a target file header. This exemplification is illustrated in FIG. 3. As shown, FIG. 3 illustrates a workstation 201 with an integrated development environment interacting with three legacy applications 321, 323, 325, on a target platform or platforms. The Integrated Development Environment includes an access authorization registration key tool 211, at least one metamodel tool 213, and other plug-ins 213. The legacy applications are shown with enumerated characteristics (metadata) in separate file headers.321A, 323A and 325A.

In still a further embodiment of the invention, the target file and the target file attributes may be encapsulated or contained in an XML document. This exemplification is illustrated in FIG. 4, which illustrates a workstation with an integrated development environment 201 interacting with three legacy applications 421, 423, and 425 on three target platforms. The Integrated Development Environment 201 includes an access authorization registration key tool 211, at least one metamodel tool 213, and other plug-ins 215. The legacy applications 421, 423, and 425, are shown with enumerated characteristics (metadata) and with associated files, which are illustrated as XML files containing the code portion and the code metadata.

Figure 5:
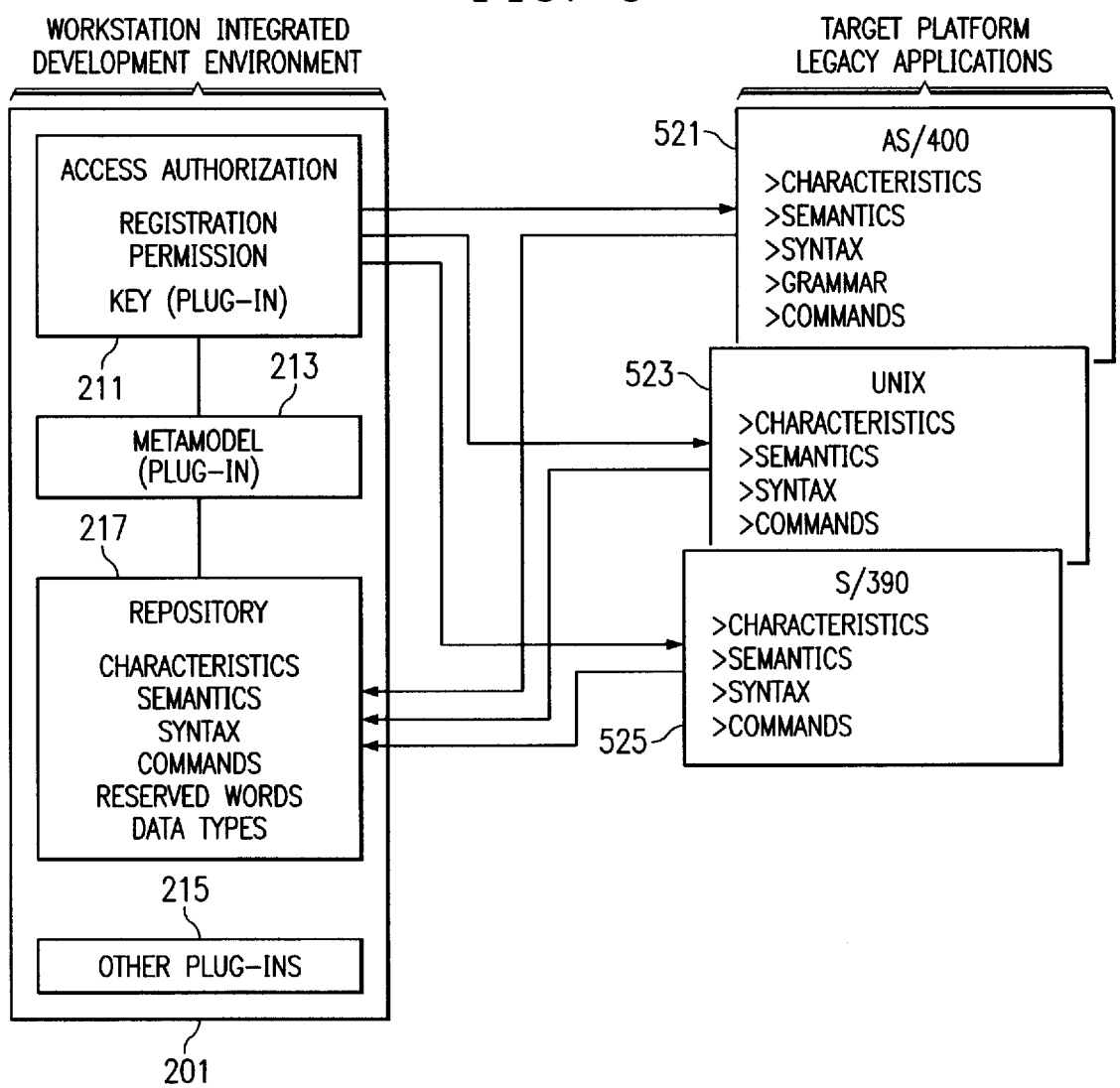

In one embodiment this includes building a registry, repository, or database of target file attributes, i.e., target file metadata. This may be an XML file or a DTD file resident in the legacy application platform or the development tool platform. FIG. 5 illustrates a workstation with an integrated development environment 201 interacting with three legacy applications 521, 523, and 525, on three target platforms. The Integrated Development Environment includes an access authorization registration key tool 211, at least one metamodel tool 213, and other plug-ins 215. The legacy applications 521, 523, and 525, are shown with enumerated characteristics (metadata) and with links to a metadata repository 217 which is used for the access/authorization comparison.

Figure 6:
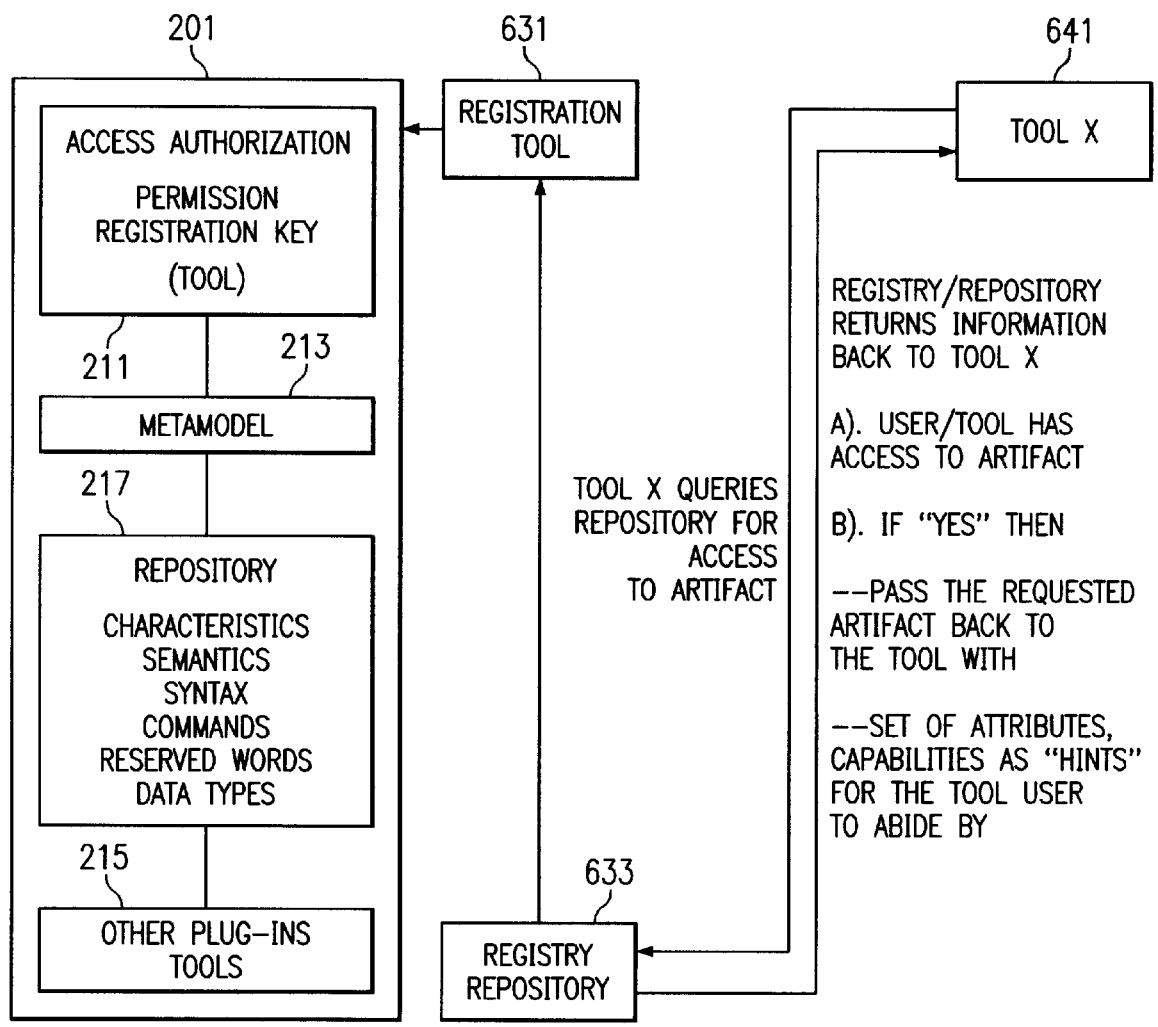
FIG. 6 illustrates the repository and registration tool in relation to the editing tool and the development environment.

FIG. 6 illustrates the repository and registration tool in relation to the editing tool and the development environment. As shown in the FIGURE, there is a development environment 201 with access authorization granted or denied through a Permission Registration Key or tool, 211, as described above. The development environment 201 further includes a metamodel 213 of the file's attributes and characteristics, drawn from a repository 217. The repository 217 contains target file characteristics, semantics, syntax, reserved words, commands, data types, and the like. The development environment 201 also has other plug-ins and tools, 215.

FIG. 6 also shows the registration tool 631, a registry repository 633, and an editing tool 641. In operation, tool x 641 queries the Registry/Repository 633 for access to an artifact. The Registry/Repository returns the query back to Tool X 641, either granting or denying access. If access is granted, the requested artifact is passed to the tool (for editing or the like) with a set of attributes, capabilities, characteristics, and the like for the tool 641 to abide by.

In another embodiment of the invention, the target file is associated with, or points to an associated file. The associated file may be a document type definition (DTD) file. A DTD is a specific definition that follows the rules of the Standard Generalized Markup Language. A DTD is a specification that accompanies the target file and identifies the codes (or markup), the topic headings, and so forth and how each is to be processed. By associating a DTD with a target file, any tool that has a DTD "reader" (or "SGML compiler") should be able to edit, plug-in to, or otherwise process the document and display or print it as intended. A compiler parses the DTD and then prints, displays, or compiles the target file accordingly.

5. Establishing Compatibility Between the Tool and the Target File

The development tool capability metadata and the target characteristics metadata are matched to determine compatibility and access. Prior to opening the target file, the tool establishes compatibility between the tool capabilities and the target files attributes. This may be accomplished by reading target file attributes from a collection of target file attributes, for example, from the target file header, an associated XML file or DTD file, or a repository or registry. The tool, the operating system, or the target file (typically using a tool) queries the tool capabilities and the collection of target file attributes to determine compatibility. The querying may be a series of simple queries, compound queries, sub-queries, and the like. This is a search for tool capability and target attribute matches and mismatches to determine if the tool has access authorization to operate on the target file, that is, to "read" the target file without modification or saving, to port add-on or plug-in applications to the target file, or to open, edit, and save the target file.

FIG. 8 illustrates the matching 805 of the development tool metadata 801 and the target file metadata 803 to determine if access should be granted or denied. This is carried out by doing an item-by-item or element-by-element match of development tool 801 capabilities with target file 803 attributes with suitable logic 805.

FIG. 8 is a high level flow chart of the method of one embodiment of the invention, where the user's USERID and PASSWORD are tested for access 801, and if successful, the development tool is tested for a registration permission key 803. If successful, that is, if the tool has a registration permission key, access is authorized 807. This indicates that the compatibility of tool capabilities and application attributes has previously been carried out. If the development tool does not have a registration permission key, the tool is checked for a match of tool metadata and target metadata 805, using the logic of FIG. 8, as shown in FIG. 7. If successful, access is authorized 807. If unsuccessful, full access is denied 813, but partial access may be granted.

The matching of tool capabilities with target file attributes includes the absence of a capability or an ability to inadvertently corrupt or destroy the target file, as by returning the file with changed attributes, or added artifacts, such as the "□" of the Rich Text Format ("RTF"), the line wrap of most text editors, the introductory "$02_H$" of Adobe Acrobat, or the grammatical and syntactical errors of "drag and drop" software developers kits and associated languages.

The absence of a capability or an ability to inadvertently corrupt or destroy the target file can mean either the absolute absence of such ability, or that the ability to do damage is blocked by tool action in response to target attributes. This may be determined by the administrator of the target file or the target platform, or by the tool developer.

When there is a mismatch between tool capabilities and target file attributes, access may be completely denied, or access may be read only, that is allow the tool to "Open" to "Read", but not to "Modify" or "Edit" or "Save" in such a way as to change the target file's attributes. If, however, the tool capabilities match the target attributes, access is granted and the tool opens the target file.

6. Access Tools and Key Registration Tools

The access or key registration tool must recognize target file attributes, and have a point of reference for its ability to match tool capabilities against target attributes. For example, the tool must read the target file header, the repository of target file attributes, or the associated XML or DTD file to determine target attributes. This is so that the tool has the ability to detect target attributes and take appropriate action, for example, highlighting the attempted action, blocking the attempted action, or just warning the user.

In a preferred embodiment of the invention, the access tool or registration permission key tool accesses the target file, an associated file, or the repository, opens a dialog box, consults an enumeration of possibly access-blocking attributes, verifies that the user has personal access, that the development tool has capability-attribute match access, and opens the target file if full access is granted. Otherwise the access tool or the operating system (including other system software), or the access tool and the operating system (including other system software) may only authorize "Read" access without potentially corrupting "Save" access.

6. Creation of A New File Based Upon Repository Metadata

FIG. 9 illustrates a further embodiment of the invention where the repository contains a style sheet or similar artifact or aid for creating or editing a file of a file type stored in the repository. According to this embodiment the repository 217 contains a storehouse of data about the file to be created or edited. Thus, the data in the metadata repository can be used to create or modify a file, and the newly crated or modified file takes on the attributes stored in the repository metadata. The development environment 201 detects faults or changes in attributes and characteristics and assures conformity to the metadata stored in or accessed by repository 217.

The repository 217 contains a style sheet 901 or a known good template. In the case of a known good template, the template, the template may be used to create a derivative file that inherits the characteristics and attributes of the template, with conformity enforced by parsers, editors, and precompilers.

In an alternative exemplification, the new file or edited file is encapsulated in an XML file with a matching style sheet. By a style sheet is meant an electronic or digital definition of a document's appearance, most commonly through the use of tags. A highly simplified COBOL style sheet 901 is shown in FIG. 9. The style sheet is typically specified at the beginning of an electronic file, either by embedding it or linking to it. This style sheet applies to the entire file, and contains characteristics and attributes of the target file to be created or edited.

8. Illustrative Example

The following scenario illustrates the method, system, and program product of the invention. In this scenario the platform owner has just completed the installation of an IDE. The system administrator then brings up the Registration Permission Key tool for this IDE to uniquely identify and register the appropriate accessibility and actions for the file types and artifacts for each platform of legacy applications that they wish to register.

At this point, the developers using the IDE can then access the file types and artifacts on the target platform(s). The developer's accessibility to the files from the IDE will be determined based upon their userid accessibility authorizations (none, read-only, read-write, execute-only) as obtained from the metamodel which was instantiated at the time of the execution of the registration permission key tool.

For the files which the developer is authorized to access and bring down to the IDE, only the actions specified by the system administrator in instantiating the registration permission key will be allowed. This prevents the developer from accidentally or intentionally using a non-approved tool against the target, which may result in the corruption of the file and loss of data. This access information was obtained from the metamodel which was instantiated at the time of the execution of the registration permission key tool.

For example, the developer will only be able to edit a fixed record length format file with approved editors which adhere to fixed record length formats assuming that the developer has authorization to 'edit' (read/write) the file in accordance with the information contained in the metamodel which was instantiated by the registration permission key tool.

Another example, if the developer wishes to compile a COBOL file which was imported from a target platform which was registered by the system administrator, the invocation of the compilation action will result in the compilation of the file on the appropriate remote target platform with the appropriate compiler and appropriate options (or even JCL if there is one made available).

When the developer of the IDE wishes to debug the COBOL file, the debug tool (plug-in) will know what target platform to connect and communicate to for the execution in debug mode (assuming that the developer has authorization per the information contained in the metamodel per the registration permission key tool) to perform the action. Likewise for execution and deployment.

Checkin/checkout of the target file from the target platform back to the development tool, and then back to the target platform, will also utilize the information stored within the metamodel from the registration permission key tool. A validation of whether or not the developer has the authorization to check-in is made, then if the developer is authorized, the checkin of the edited file to the target platform (file system or the IBM S/390 Source Configuration Management application) is made.

While the invention has been described and illustrated with respect to certain preferred embodiments and exemplifications, it is not intended to limit the scope of the invention thereby, but solely by the claims appended hereto.

We claim:

1. A method of accessing a target file with a development tool having tool capabilities, comprising the steps of:
    (a) determining target file attributes metadata;
    (b) matching target file attributes metadata to tool capabilities;
    (c) limiting development tool access to the target file for executing, modifying, or saving the target file if development tool capabilities mismatch target file attributes metadata so as to permit the tool to return the target file with corrupted attributes metadata; and
    (d) granting development tool access to the target file if the development tool capabilities match the target file attributes metadata.

2. The method of claim 1 comprising reading a target file header to determine target file attributes metadata.

3. The method of claim 1 comprising reading a repository of target file attributes metadata.

4. The method of claim 1 comprising reading an associated file to determine target file attributes metadata.

5. The method of claim 4 wherein the associated file is a DTD file.

6. The method of claim 1 comprising reading an XML file containing the target file to determine target file attributes metadata.

7. The method of claim 6 comprising encapsulating the target file and the target file attributes metadata in an XML document.

8. The method of claim 1 comprising assigning a registration permission key tool to the development tool if the development tool capabilities match the target file attributes metadata.

9. A method of accessing a target file with a development tool having tool capabilities, comprising the steps of:
    (a) determining target file attributes metadata from a source of target file attribute information chosen from the group consisting of
        (1) target file header information;
        (2) a repository of target file attributes metadata;
        (3) an associated DTD file; and
        (4) an encapsulating XML file;
    (b) matching target file attributes metadata to tool capabilities;
    (c) limiting development tool access to the target file for executing, modifying, or saving the target file if development tool capabilities mismatch target file attributes metadata so as to permit the tool to return the target file with corrupted metadata attributes; and
    (d) granting development tool access to the target file if the development tool capabilities match the target file attributes metadata.

10. A method of accessing a target file with a development tool having tool capabilities, comprising the steps of:
    (a) determining target file attributes metadata;
    (b) matching target file attributes metadata to tool capabilities including determining if tool capabilities include the capability to return the target file with changed attributes metadata;
    (c) limiting development tool access to the target file for executing, modifying, or saving the target file if development tool capabilities mismatch target file attributes metadata so as to permit the tool to return the target file with corrupted attributes metadata; and
    (d) granting development tool access to the target file if the development tool capabilities match the target file attributes metadata.

11. The method of claim 10 comprising determining target file attributes metadata from a source of target file attribute information chosen from the group consisting of
    (a) target file header information;
    (b) a repository of target file attributes metadata;
    (c) an associated DTD file; and
    (d) an encapsulating XML file.

12. The method of claim 10 comprising assigning a registration permission key tool to the development tool if the development tool capabilities match the target file attributes metadata.

13. A system for editing a target file, said system comprising an editing platform having a development tool, said editing platform being configured and controlled to access the target file with the development tool having tool capabilities, by the steps of:
    (a) determining target file attributes metadata;
    (b) matching target file attributes metadata to tool capabilities;
    (c) limiting development tool access to the target file to execute, modify, or save the target file if development tool capabilities mismatch target file attributes metadata so as to permit the development to return the target file with corrupted attributes metadata; and
    (d) granting development tool access to the target file if the development tool capabilities match the target file attributes metadata.

14. The system of claim 13 wherein the system is configured and controlled to read a target file header to determine target file attributes metadata.

15. The system of claim 13 wherein the system is configured and controlled to read a repository of target file attributes metadata.

16. The system of claim 13 wherein the system is configured and controlled to read an associated file to determine target file attributes metadata.

17. The system of claim 13 wherein the associated file is a DTD file.

18. The system of claim 13 wherein the system is configured and controlled to read an XML file containing the target file to determine target file attributes metadata.

19. The system of claim 13 wherein the system is configured and controlled to encapsulate the target file and the target file attributes metadata in an XML document.

20. The system of claim 13 wherein the system is configured and controlled to assign a registration permission key tool to the development tool if the development tool capabilities match the target file attributes metadata.

21. A system for accessing a target file with a development tool having tool capabilities, said system comprising an editing platform having a development tool, said system being configured and controlled to:
   (a) determine target file attributes metadata from a source of target file attribute information chosen from the group consisting of:
      1) target file header information;
      2) a repository of target file attributes metadata;
      3) an associated DTD file; and
      4) an encapsulating XML file;
   (b) match target file attributes metadata to tool capabilities including determining if tool capabilities include the capability to return the target file with changed attributes metadata;
   (c) limit development tool access to the target file to execute, modify, or save the target file if development tool capabilities mismatch target file attributes metadata so as to cause the development tool to change target file attributes metadata; and
   (d) grant development tool access to the target file and assigning a registration permission key tool to the development tool if the development tool capabilities match the target file attributes metadata.

22. The program product of claim 21 wherein the program product configures and controls the computer system to assign a registration permission key tool to the development tool if the development tool capabilities match the target file attributes metadata.

23. The program product of claim 21 wherein the steps of determining target file attributes metadata and matching tool capabilities to the target file attributes metadata comprises determining if tool capabilities include the capability to return the file with changed attributes metadata.

24. A program product comprising a storage medium having computer readable program code thereon to direct a computer system to edit a target file, said system comprising an editing platform having a development tool, said program code configuring and controlling said computer system to access the target file with the development tool having tool capabilities, by the steps of:
   (a) determining target file attributes metadata;
   (b) matching target file attributes metadata to tool capabilities;
   (c) limiting development tool access to the target file if development tool capabilities mismatch target file attributes metadata to result in corrupted target file attributes metadata; and
   (d) granting development tool access to the target file if the development tool capabilities match the target file attributes metadata.

25. The program product of claim 24 wherein the program product configures and controls the computer system to read a target file header to determine target file attributes metadata.

26. The program product of claim 24 wherein the program product configures and controls the computer system to read a repository of target file attributes metadata.

27. The program product of claim 24 wherein the program product configures and controls the computer system to read an associated file to determine target file attributes metadata.

28. The program product of claim 27 wherein the associated file is a DTD file.

29. The program product of claim 28 wherein the program product configures and controls the computer system to encapsulate the target file and the target file attributes metadata in an XML document.

30. The program product of claim 24 wherein the program product configures and controls the computer system to read an XML file containing the target file to determine target file attributes metadata.

31. A program product comprising a storage medium having computer readable program code thereon to direct a computer system to edit a target file, said system comprising an editing platform having a development tool, said program code configuring and controlling said computer system to access the target file with the development tool having tool capabilities, by the steps of::
   (a) determining target file attributes metadata;
   (b) matching target file attributes metadata to tool capabilities including determining if tool capabilities include the capability to return the target file with changed attributes metadata;
   (c) limiting development tool access to the target file for executing, modifying in or saving the target file if development tool cap abilities mismatch target file attributes metadata; and
   (d) granting development tool access to the target file if the development tool capabilities match the target file attributes metadata.

32. The program product of claim 31 wherein the program code configures and controls the system to determine target file attributes metadata from a source of target file attribute information chosen from the group consisting of
   (a) target file header information;
   (b) a repository of target file attributes metadata;
   (c) an associated DTD file; and
   (d) an encapsulating XML file.

33. The program product of claim 23 wherein the program product configures and controls the system to assign a registration permission key tool to the development tool if the development tool capabilities match the target file attributes metadata.

34. A system for accessing a target file with a development tool having tool capabilities and residing on a computer, said system carrying out the steps:
   (a) determining target file attributes metadata;
   (b) matching target file attributes metadata to tool capabilities;
   (c) limiting development tool access to the target file if development tool capabilities mismatch target file attributes metadata; and
   (d) granting development tool access to a file in a repository and to the target file if the development tool capabilities and the file in the repository match the target file attributes metadata.

35. The system of claim 34 wherein the file in the repository is a style sheet carrying target file attributes metadata.

36. The system of claim 34 wherein the file in the repository is a template.

37. The system of claim 34 wherein the target file inherits attributes metadata from the file in the repository.

38. A program product comprising computer readable instructions for configuring and controlling a computer system to access a target file in a repository with a development tool having tool capabilities and residing on a computer, said computer system carrying out the steps of:
   (a) determining target file attributes metadata;
   (b) matching target file attributes metadata to tool capabilities;

(c) limiting development tool access to the target file for executing, modifying, or saving the target file if development tool capabilities mismatch target file attributes metadata so as to permit the tool to return the target file with corrupted attributes metadata; and (d) granting development tool access to a file in a repository and to the target file if the development tool capabilities and the file in the repository match the target file attributes metadata.

39. The program product of claim 38 wherein the file in the repository is a style sheet carrying target file metadata characteristics.

40. The program product of claim 38 wherein the file in the repository is a template.

41. The program product of claim 38 wherein the target file inherits attributes metadata from the file in the repository.

* * * * *